(12) United States Patent
Knittel et al.

(10) Patent No.: US 10,776,698 B2
(45) Date of Patent: Sep. 15, 2020

(54) METHOD FOR TRAINING AN ARTIFICIAL NEURAL NETWORK

(71) Applicant: CANON KABUSHIKI KAISHA, Tokyo (JP)

(72) Inventors: Anthony Knittel, Maroubra (AU); Tuan Hue Thi, New York, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 15/220,885

(22) Filed: Jul. 27, 2016

(65) Prior Publication Data

US 2017/0032246 A1    Feb. 2, 2017

(30) Foreign Application Priority Data

Jul. 31, 2015    (AU) .................... 2015207945

(51) Int. Cl.
  *G06N 3/08*    (2006.01)
(52) U.S. Cl.
  CPC .................... *G06N 3/084* (2013.01)
(58) Field of Classification Search
  CPC .................. G06N 3/084; G06N 3/082
  See application file for complete search history.

(56) References Cited

U.S. PATENT DOCUMENTS

| | | | | |
|---|---|---|---|---|
| 3,972,689 A * | 8/1976 | Knittel | .................... | C30B 23/00 117/109 |
| 8,862,527 B2 * | 10/2014 | Garner | .................... | G06N 3/088 706/25 |
| 10,043,078 B2 * | 8/2018 | Winter | .................... | G06T 7/194 |

(Continued)

FOREIGN PATENT DOCUMENTS

WO    WO-2015011688 A2 *    1/2015    .......... G06N 3/0454

OTHER PUBLICATIONS

Wan, L., Zeiler, M., Zhang, S., LeCun, Y., Fergus, R., "Regularization of Neural Networks using DropConnect", 2013, Proceedings of the 30th International Conference on Machine Learning, PMLR 28(3): p. 1058-1066, Atlanta, Georgia, USA (Year: 2013).*

(Continued)

*Primary Examiner* — Michael B Holmes
(74) *Attorney, Agent, or Firm* — Canon U.S.A., Inc. IP Division

(57) ABSTRACT

A method of training an artificial neural network The artificial neural network comprising a plurality of connections connecting nodes arranged in at least an initial and a subsequent layer. The method comprises receiving a training example, the training example having input values, a target, and an associated training salience value indicating an importance of the input values to determining the target. The method further comprises determining salience values for nodes of the initial layer from the training salience value; determining an activation value for at least one node of the subsequent layer by propagating the input values using a subset of the connections selected based on the determined salience values for the nodes of the initial layer; and training the artificial neural network using the activation value, the trained artificial neural network configured to determine a relationship between the input data values and the target.

19 Claims, 9 Drawing Sheets

(56) References Cited

U.S. PATENT DOCUMENTS 10,380,431 B2 * 8/2019 Winter .............. G06K 9/00771
10,432,896 B2 * 10/2019 Winter .............. G06K 9/00369

OTHER PUBLICATIONS

Iqbal, R., "Empirical Learning Aided by Weak Domain Knowledge in the Form of Feature Importance", 2011 International Conference on Multimedia and Signal Processing, Guilin, Guangxi, China (Year: 2011).*

Srivastava, N., Hinton, G., Krizhevsky, A., Sutskever, I., Salakhutdinov, R., "Dropout: a simple way to prevent neural networks from overfitting", The Journal of Machine Learning Research, vol. 15 Issue 1, p. 1929-1958, Jan. 2014 (Year: 2014).*

Hinton et al., Improving neural networks by preventing co-adaptation of feature detectors, arZiv.org, Jul. 2012, pp. 1-18.

Jhuang et al., A biologically inspired system for action recognition, Proc. of Eleventh IEEE International Conference on Computer Vision, 2007, pp. 1-8.

* cited by examiner

METHOD FOR TRAINING AN ARTIFICIAL NEURAL NETWORK

REFERENCE TO RELATED PATENT APPLICATION(S)

This application claims the benefit under 35 U.S.C. § 119 of the filing date of Australian Patent Application No. 2015207945, filed 31 Jul. 2015, hereby incorporated by reference in its entirety as if fully set forth herein.

TECHNICAL FIELD

The present invention relates to a method, system and apparatus for training an artificial neural network. The present invention further relates to a computer readable medium storing instructions executable to implement a method for training an artificial neural network. Training the artificial neural network configures the parameters of the artificial neural network. The system, method and apparatus described use a combination of training data elements and associated training salience measurements.

BACKGROUND

Analysis of data often involves classifying the data into categories, for example recognising a label that represents an object present in the image. A common method is to determine the relationships between data and labels using an artificial neural network classifier. An artificial neural network is composed of a set of nodes, a set of weights and a set of edges, also referred to as connections. Each of the edges is weighted and connects two nodes of the network. The weighted edges are also referred to as weighted connections. The artificial neural network is trained using a set of training input instances and training targets. The artificial neural network is trained to apply a classification label to new data based on the relationship between training data instances and labels.

A common problem is that artificial neural networks learn classification relationships that produce incorrect labels when used to classify new data. For example an artificial neural network can learn to identify pictures of dogs and correctly apply the label "dog" to the training images. However, when classifying a picture of a dog that is not in the training set, the network incorrectly selects the label "cat" instead of the correct label. The term "overfitting" refers to the situation where an artificial neural network, learns to classify examples the artificial neural network has been trained on with higher accuracy than examples that have not been used in training.

A need exists to address one or more of the problems associated with training an artificial neural network.

SUMMARY

It is an object of the present disclosure to substantially overcome, or at least ameliorate, at least one disadvantage of present arrangements.

A first aspect of the present disclosure provides a method of training an artificial neural network, the method comprising: accessing the artificial neural network, the artificial neural network comprising a plurality of connections connecting nodes arranged in at least an initial and a subsequent layer; receiving a training example for the artificial neural network, the training example having input values, a target, and an associated training salience value indicating an importance of the input values to determining the target of the artificial neural network; determining salience values for nodes of the initial layer from the training salience value of the received training example; determining an activation value for at least one node of the subsequent layer by propagating the input values using a subset of the connections, the subset of the connections being selected based on the determined salience values for the nodes of the initial layer; and training the artificial neural network using the determined activation value, wherein the trained artificial neural network is configured to determine a relationship between the input data values and the target. In some arrangements, the artificial neural network comprises an input layer, and the determined salience values for the nodes in the initial layer are determined by propagating the received salience value using connections from the input layer to the initial layer.

In some arrangements, the artificial neural network comprises an input layer, and the determined salience values for the nodes in the initial layer are determined by propagating the received salience value using connections from the input layer to the initial layer.

In some arrangements, the artificial neural network has more than one subsequent layer. In some implementations, the method further comprises determining salience values for nodes of a first layer of the subsequent layers from the training salience value of the received training example, and determining an activation value for a second layer of the subsequent layers by propagating the input values using a subset of the connections, the subset of the connections being selected based upon determined salience values for the first layer.

In some implementations, the subset of the connections is determined based upon a fixed proportion of a total number of weights associated with the connections in the initial layer.

In some implementations, a distribution of the fixed proportion of the weights is determined proportionally to the determined salience value.

In some implementations, the subset of the connections is determined using random sampling of a distribution of connections in the initial layer.

In some implementations, the weights are selected with equal probability.

In some implementations, the method further comprises determining an error value representing a difference between the determined activation values and the target.

In some implementations, the artificial neural network is trained using the determined error value.

In some implementations, the training comprises back propagating the determined error value throughout the artificial neural network.

In some implementations, the method further comprises receiving a plurality of training examples; determining salience values for nodes of the initial layer from the training salience value for each of the received training examples; determining, for each of the plurality of training examples, an activation value for at least one node of the subsequent layer by propagating the input values using the subset of the connections selected based on the determined salience values for the nodes of the initial layer; determining an average of the activation value for the plurality of training examples; and training the artificial neural network using the determined average activation value.

In some implementations, the target is equal to the training input values.

In some implementations, the method further comprises receiving a plurality of additional training examples; classifying the plurality of additional training examples using the trained artificial neural network; determining an accuracy of the trained artificial neural network using the classification of the additional examples; and determining whether to further train the artificial neural network by comparing the determined accuracy to a predetermined accuracy of the artificial neural network.

A further aspect of the present disclosure provides a computer readable medium having a computer program stored thereon for training an artificial neural network, said program comprising: code for accessing the artificial neural network, the artificial neural network comprising a plurality of connections connecting nodes arranged in at least an initial and a subsequent layer; code for receiving a training example for the artificial neural network, the training example having input values, a target, and an associated training salience value indicating an importance of the input values to determining the target of the artificial neural network; code for determining salience values for nodes of the initial layer from the training salience value of the received training example; code for determining an activation value for at least one node of the subsequent layer by propagating the input values using a subset of the connections, the subset of the connections being selected based on the determined salience values for the nodes of the initial layer; and code for training the artificial neural network using the determined activation value, wherein the trained artificial neural network is configured to determine a relationship between the input data values and the target.

A further aspect of the present disclosure provides an apparatus for training an artificial neural network, the apparatus comprising: means for accessing the artificial neural network, the artificial neural network comprising a plurality of connections connecting nodes arranged in at least an initial and a subsequent layer; means for receiving a training example for the artificial neural network, the training example having input values, a target, and an associated training salience value indicating an importance of the input values to determining the target of the artificial neural network; means for determining salience values for nodes of the initial layer from the training salience value of the received training example; means for determining an activation value for at least one node of the subsequent layer by propagating the input values using a subset of the connections, the subset of the connections being selected based on the determined salience values for the nodes of the initial layer; and means for training the artificial neural network using the determined activation value, wherein the trained artificial neural network is configured to determine a relationship between the input data values and the target.

A further aspect of the present disclosure provides a system for training an artificial neural network, the system comprising: a memory for storing data and a computer program; a processor coupled to the memory for executing said computer program, said computer program comprising instructions for: accessing the artificial neural network, the artificial neural network comprising a plurality of connections connecting nodes arranged in at least an initial and a subsequent layer; receiving a training example for the artificial neural network, the training example having input values, a target, and an associated training salience value indicating an importance of the input values to determining the target of the artificial neural network; determining salience values for nodes of the initial layer from the training salience value of the received training example; determining an activation value for at least one node of the subsequent layer by propagating the input values using a subset of the connections, the subset of the connections being selected based on the determined salience values for the nodes of the initial layer; and training the artificial neural network using the determined activation value, wherein the trained artificial neural network is configured to determine a relationship between the input data values and the target.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
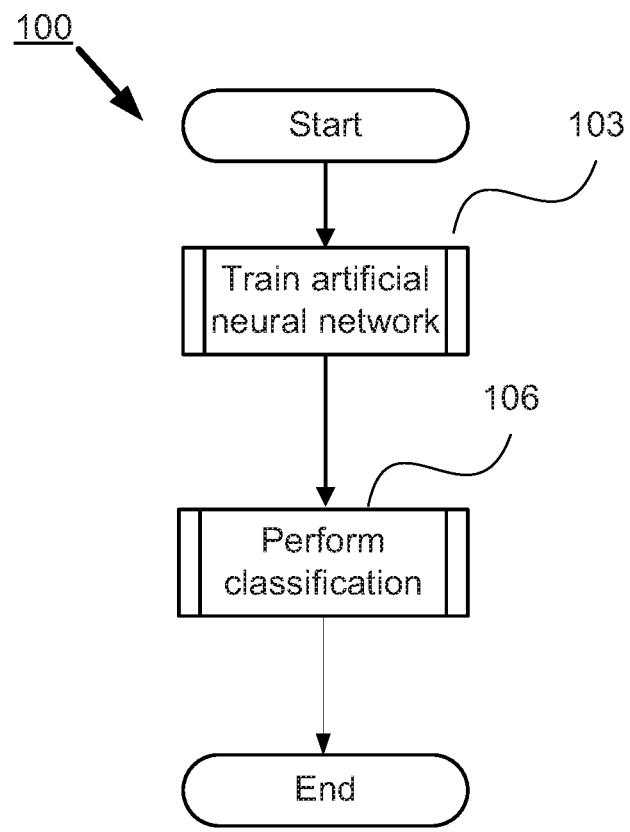
FIG. 1 is a schematic flow diagram of a method for performing classification using an artificial neural network.

A method and system for classifying data is described below.

Classification of data involves applying a label or output for an instance of data, for example by applying the label for an action present in a video sequence. A set of instances of training data and labels are used to train a classification system such as an artificial neural network. The artificial neural network is trained to be able to perform classification of instances not present in the training data, based on a relationship between data and labels for the instances of the training set.

An artificial neural network forms a classification system consisting of a network of nodes and connections. Each connection is weighted, having an associated real-value number or weight representing a strength of a connection between the nodes. The artificial neural network is defined using a number of layers, where each layer consists of a set of weights and a set of nodes. When the artificial neural network is trained for classification, each node has a real-valued number representing an activation value of the node. The activation value is a response produced by the node based on a value of inputs to the node and the connection strengths (weights). In addition to classification, artificial neural networks are used for other purposes such as reconstructing data provided to the artificial neural network as input.

To perform classification of an instance of data, the instance is provided as input data values to the artificial neural network. The input data values are used as activation values for each of the input nodes. Activation of nodes in each layer of the artificial neural network is performed by propagation of values from the input nodes to nodes in higher value layers of the artificial neural network, according to the strength of the connections between the nodes, and other functions defined by the artificial neural network, such as a sigmoid activation function. For each instance of the training data the activation value of output nodes of the artificial neural network is determined, and compared with a corresponding training target. The relationship between the activation value of the output nodes and the corresponding training target is used to modify the connections of the artificial neural network. In this manner, the artificial neural network is trained to recognise the relationship between the input data values and the target labels. The relationship between the activation value of the output nodes and the corresponding training target may, for example, relate to a difference, a sum or a negative logarithm likelihood function.

In arrangements described below, target, training target, and target label correspond to the same concept. In one implementation, a target label is represented by a value that has meaning for humans, e.g. "dog", while a target is represented by a number, e.g. 23, which is an internal representation for "dog".

A problem with artificial neural networks is that such networks learn to classify instances of the training set more accurately than examples not in the training set. This problem is known as overfitting.

One method of reducing overfitting is to inhibit the operation of a proportion of the connections in the artificial neural network during training. For each training instance, a random set of the weights in the artificial neural network are disabled, such that the disabled weights do not influence the artificial neural network activation. The set of weights to disable is determined independently for each training instance. When the artificial neural network is used to perform classification, all of the artificial neural network weights are used and none are disabled. When weight-disabling is used in training an artificial neural network, the artificial neural network often shows less overfitting, and performs better at classifying images that were not used in training than when weight disabling is not used. On many classification tasks, particularly when limited training data is available, the use of random weight disabling is not sufficient to allow effective learning by the artificial neural network. Random weight disabling does not allow further information about the data to be used to assist with training of the artificial neural network, as the weights to disable are chosen randomly.

A second method of reducing overfitting is to alter or inhibit a proportion of the data of each training instance, also referred to as masking the input data. The input data to be inhibited or masked is based on a measure of the data elements, for example a foreground selection function allows moving elements in video to be identified, and allows training to emphasize the moving elements, assisting learning. Inhibiting data elements allows certain aspects of the input data to influence training while other less salient aspects do not. Masking input data elements only allows weights in the network connected to the input to be disabled.

The use of masking of input data allows knowledge of the problem to improve classification system performance However, masking of input data using such an approach is not sufficient for allowing accurate classification on many tasks.

Thus there exists a need for a method for addressing the problem of overfitting that allows saliency information to be incorporated to influence learning through all layers of the artificial neural network rather than just the input.

The presently described arrangements increase the accuracy of classification by the artificial neural network by reducing overfitting. The arrangements described relate to a method of training an artificial neural network implemented on a computer system, or on a device similar to a computer system, such as a personal electronics device.

Figure 8A:
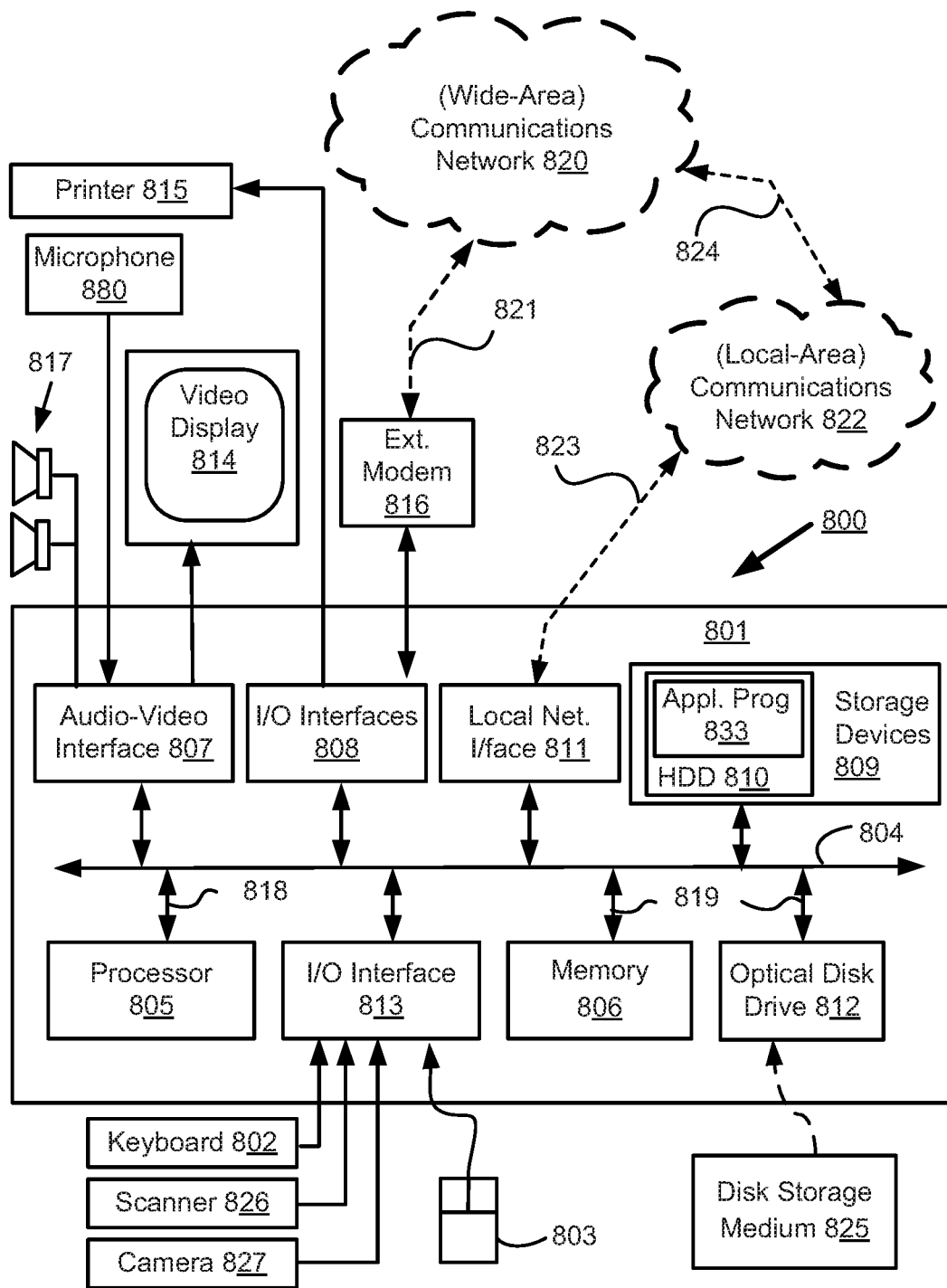
FIGS. 8A and 8B form a schematic block diagram of a general purpose computer system upon which arrangements described can be practiced.
Figure 8B:
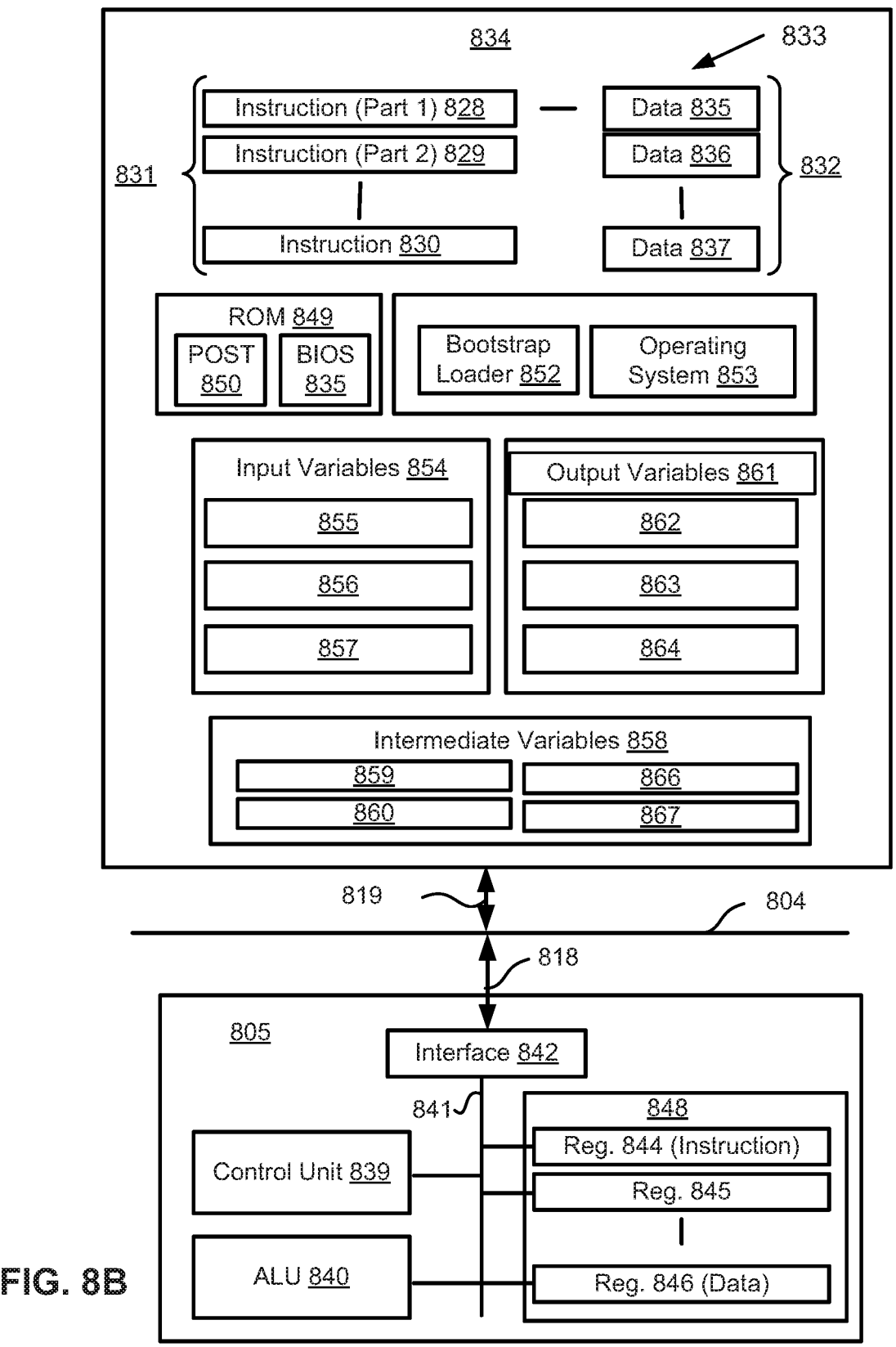

FIGS. 8A and 8B depict a general-purpose computer system 800, upon which the various arrangements described can be practiced.

As seen in FIG. 8A, the computer system 800 includes: a computer module 801; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (IO) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM™-PC's and compatibles, Sun Sparcstations™, Apple Mac™ or like computer systems.

The methods of training an artificial neural network and performing classification described herein may be implemented using the computer system 800 wherein the processes of FIGS. 1-5 and 7, to be described, may be implemented as one or more software application programs 833 executable within the computer system 800. In particular, the steps of the method of FIGS. 1-5 and 7 are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the methods of training an artificial neural network and performing classification and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from a computer readable medium, and executed by the computer system 800. The software is loaded into the computer system 800 from the computer readable medium, and then executed by the computer system 800. A computer readable medium having such software or computer program recorded on the computer readable medium is a computer program product. The use of the computer program product in the computer system 800 preferably effects an advantageous apparatus for the described methods of training an artificial neural network and performing classification.

Thus, for example, the software 833 may be stored on an optically readable disk storage medium (e.g., CD-ROM) 825 that is read by the optical disk drive 812. A computer readable medium having such software or computer program recorded on it is a computer program product.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the storage device 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 835, also typically stored in the ROM 849, for correct operation. Once the POST program 850 has run successfully, the BIOS 835 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfill various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 822, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The described arrangements use input variables 854, which are stored in the memory 834 in corresponding memory locations 855, 856, 857. The described arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 1-5 and 7 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The method of training an artificial neural network may alternatively be implemented in dedicated hardware such as one or more integrated circuits performing the functions or sub functions of training the artificial neural network or the artificial neural network itself. Such dedicated hardware may include graphic processors, digital signal processors, or one or more microprocessors and associated memories.

FIG. 1 shows a schematic flow diagram of a method 100 for performing classification. The method 100 is executable on the processor 805. The method 100 may be implemented by one or more submodules of the software application 833 stored in the memory 806. The method 100 comprises a training step 103 for training a classifier and a classifying step 106 for performing classification.

Under execution of the processor 805, the method 100 starts with the training step 103. The training step 103 executes to receive and use a training dataset to define weights of an artificial network, referred to hereafter as a base network, resulting in a trained artificial neural network. A method 200 of training a classifier, as executed at step 103, is described hereafter with reference to FIG. 2. An example diagram of the artificial neural network is shown by a base network 600 in FIG. 6A. Under execution of the processor 805, the method 100 progresses to the classifying step 106. At the classifying step 106, the trained base network is used to perform classification of the classification data by applying a classification label to each instance of the classification data. A method 700 of performing classification of data, as executed at step 106, is described in more detail with reference to FIG. 7.

Figure 6A:
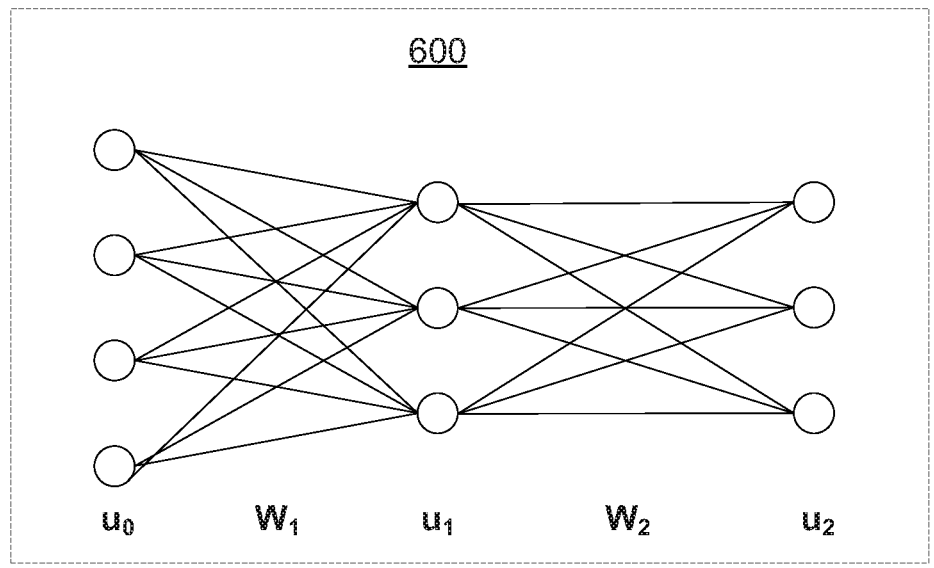
FIGS. 6A and 6B are a block diagram showing an artificial neural network of the base network used in FIG. 1, and the active network used in FIG. 3.

In the arrangements described, the base network is an artificial neural network, which uses a feed-forward process to activate the nodes of the base network based on inputs, and the base network is trained using backpropagation of an error between the activation value of the output nodes and the target for each training instance or training example. The base network 600 represents a neural network consisting of sets of nodes and weighted connections arranged in layers, as shown in FIG. 6A.

An example of the training data used is for classification of video, for example using a training dataset consisting of video of human actions, each with a corresponding label representing the action present in the video. The training dataset, and the data to be classified, may be stored in the memory 806 or may be received by the computer module 801 through inputs such as the camera 827, the disk storage medium 825, or from a remote device such as a server computer capable of communication with the computer system 801 via a network such as the network 822 or the network 820.

The described arrangements use a training example, comprising input values, a target and a training saliency measure associated with each instance of the training dataset. The training saliency measure indicates an importance of the corresponding input values to determine the target. The training saliency measure is predetermined. For example, for classification of human actions in a video stream, detection of a running action would have a higher training saliency measure than detection of a moving car.

The training saliency measure is used to select a subset of the weights of the base network for each instance to determine an artificial neural network referred to as an active network. The active network receives the input values and target, and modifications to the active network are determined that are used to improve classification accuracy of the active network based on the received instances. Modifications determined for the active network are used to train the base network. The trained base network is configured to determine a relationship between the input data and the target such that the accuracy of classification using the trained base network is improved.

The described arrangements use a subset of the weights of the base network for each training example reduces interdependency between features of the base network, and acts as a mixture of models, which reduces overfitting effects in classification conducted using the trained base network. Some existing approaches to training artificial neural networks choose the weights to maintain using a uniform random distribution. In contrast, in the arrangements described herein, weights to maintain are chosen based on the training saliency measure. Use of a training saliency measure allows training to be performed using weights connected to the more relevant aspects of the training data, and allows more targeted learning. Targeted learning may reduce overfitting effects, for example on small datasets. The described methods of selecting weights to maintain for each selected instance of the training dataset allows the beneficial effects of weight inhibition to be captured, while also allowing further information of the important aspects of the training data to be emphasised.

The described methods of using the training saliency measure for selecting which weights to maintain use a real-valued measure of saliency. The use of the real-valued saliency measure allows continuous variability in the influence of the saliency measure. In some existing arrangements, such as arrangements which mask input data, a mask is applied discretely on the inputs of the training data. In contrast, the described methods allow the training salience measurement to influence learning at all levels of the base network. The described methods allow the training salience measurement to be applied proportionally to weights connected to each node of the base network. In contrast, existing masking methods only apply masking on the input layer, and the masking is applied equally to all weights connected to each input node. Applying the influence of training salience measurement at all levels, in a real-valued manner, as per the described methods, allows a biased influence on learning to occur throughout the base network.

FIGS. 2 to 7 show an example implementation of training an artificial neural network. The implementation of FIGS. 2 to 7 may for example be used for training an artificial neural network for classifying human actions present in video sequences.

Figure 2:
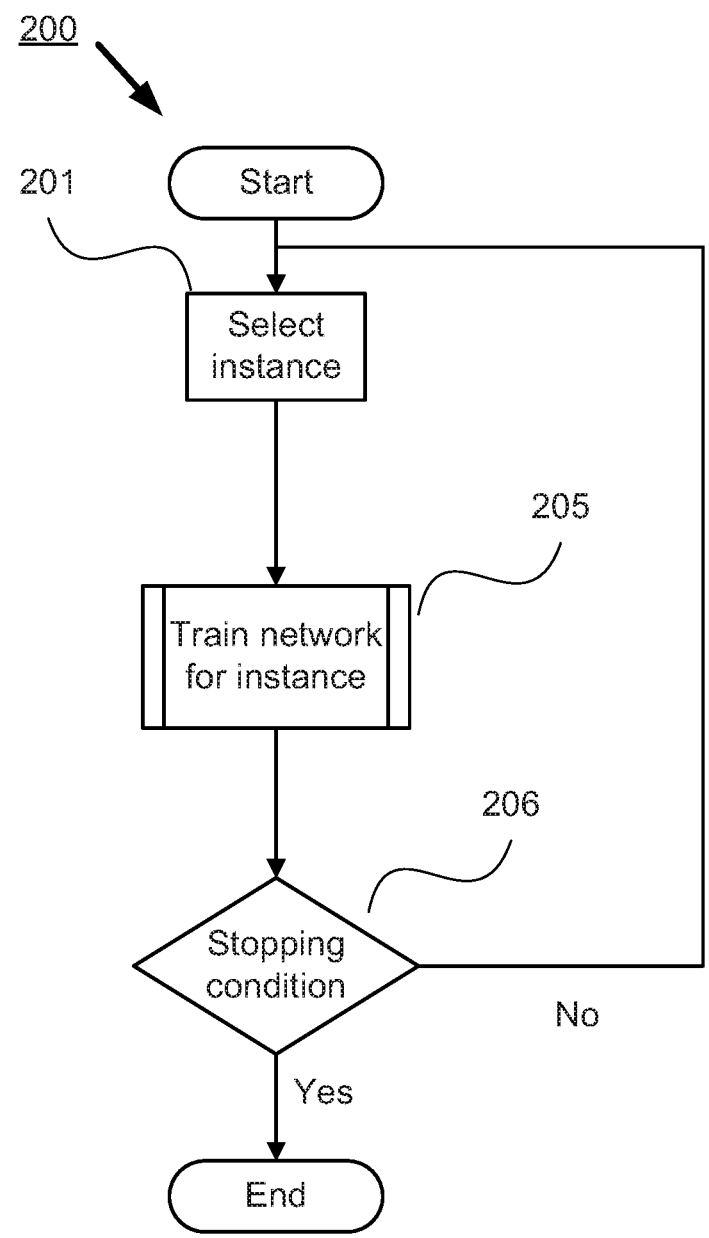
FIG. 2 is a schematic flow diagram showing a method of training the artificial neural network as used in the method of FIG. 1.

The method 200 of training an artificial neural network, as executed at step 103, will now be described with reference to FIG. 2. The method 200 may be implemented by one or more submodules of the application 833 stored in the memory 806, and controlled by execution of the processor 805. The method 200 represents a method of training an artificial neural network.

The method 200 starts with execution of a select instance step 201. The select instance step 201 executes to receive a training dataset, as at step 103 of the method 100. The training dataset comprises a set of training examples. The step 201 executes to select one instance of the training examples of the training dataset. Each training example comprises a training salience measure, one or more input values and a target, such that the training salience measure and target correspond with the training input values.

The method 200 proceeds under execution of the processor 805 to a training step 205. Step 205 executes to access or receive and train the base network 600 for the selected instance using the associated training salience measure, training input and training target. Execution of the step 205 operates to train the base network 600 such that the trained base network is operable to classify the training dataset more accurately than without such training. A method 300 of training the base network, as executed at step 205 is described hereafter in relation to FIG. 3.

In an alternative implementation, training of the base network 600 implemented by execution of step 205 is applied based upon an average of activation values determined from several instances of the training dataset, referred to as a batch. For example, if a batch size of 100 is used, 100 training examples are received, selected and used to perform the training step 205. However, in such implementations, no modification or training is made to the base network 600. In such implementations, the activation values are averaged and used to train the base network 600 after the step 205 has taken place for each instance in the batch.

Upon completion of the step 205, the method 200 progresses under execution of the processor to step 206. At step 206, the method 200 executes to determine if a stopping condition is satisfied. If the stopping condition is not satisfied, the step 206 returns "No" and the method 200 executes to return to the step 201 to select another instance of the training dataset and the method 200 repeats as described hereinbefore. The method 200 continues to repeat execution of the steps 201 and 205 until the stopping condition is satisfied. Once the stopping condition is satisfied, the step 206 returns "Yes" and the method 200 ends.

In the example implementation described, the base network 600 is a representation of an artificial neural network. The network topology of the base network 600 is a 2 layer network, consisting of a set of input layer nodes, a set of first layer weights, a set of first layer nodes, a set of second layer weights and a set of second layer nodes, also known as output nodes. The input layer nodes can be considered as initial layer nodes, and the first and second layer nodes can be considered as subsequent layer nodes. In an alternative implementation, the base network may be implemented as a convolutional neural network. In such a convolutional neural network, weight values in each layer of the artificial neural network are convolved over the inputs to that layer. In a further alternative implementation, multiple layers are used in the base network, forming a deep topology.

In determining if the stopping condition is met, the step 206 executes to determine if training of the base network should be discontinued. For example, the stopping condition may be met after a fixed number of training examples, such as one million training examples have been selected and training conducted as per step 205.

In an alternative implementation an additional, separate training dataset may be used, known as a validation set. In such implementations, the step 206 executes to receive the validation set and classifies training examples of the validation set using the trained artificial neural network. The step 206 executes to determine an accuracy of the trained artificial neural network using the classification of the validation set, and determines whether to further train the artificial neural network. In such instances the stopping condition is satisfied when the determined accuracy of classifying instances of the validation set decreases with further training.

The training dataset comprises a set of training data, a set of training targets and a set of training salience measures, such that the training targets and salience measures each correspond with an instance of the training data. An example training dataset is a set of 1000 training examples, each example consisting of a video sequence containing human actions, a label representing the human action illustrated in the corresponding video, and a saliency measure tensor, of the same dimension as the video sequence, representing the saliency of each pixel in the corresponding video. Each video represents a training input instance, and is composed of a series of still image frames, for example 500 frames of dimension 300×200. An example of the training saliency measure for each video is the spectral visual approach, indicating pixels that represent significant regions of visual input. A corresponding training target is present for each training input instance, for example a label representing the human action present in the corresponding video, such as the action of running.

In an alternative implementation, the target is equal to the training input values for each instance of the training dataset, representing an implementation of an autoencoder that is trained to reconstruct the input data. Such an autoencoder is trained using the training dataset to be able to produce reconstruction of new instances of the input data with improved accuracy.

Figure 6B:
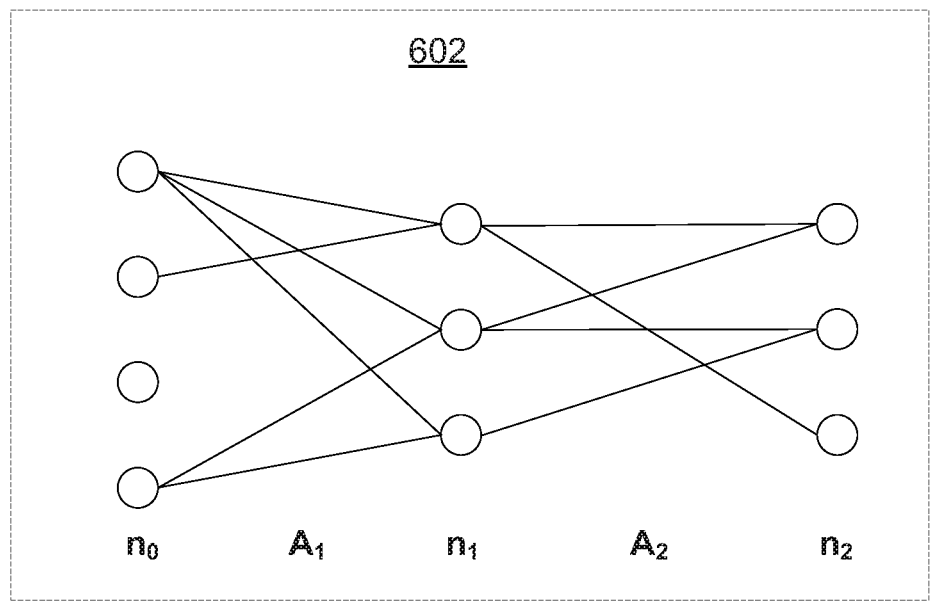

FIG. 6A shows an example of the base network 600, and FIG. 6B shows a corresponding active network 602. In FIG. 6A, the nodes of an input layer are represented by $u_0$, and weighted connections of the first or input layer $u_0$ are represented by a tensor $W_1$. Nodes of a second layer are represented by $u_1$ in the network 600, and weighted connections of the second layer $u_1$ are represented by $W_2$. The output nodes of the base network 600 are shown as $u_2$.

FIG. 6B shows nodes $n_0$, $n_1$ and $n_2$ of the active network 602. The nodes $n_0$, $n_1$ and $n_2$ are equivalent to the corresponding nodes $u_0$, $u_1$ and $u_2$ of the base network 600. Weighted connections of the active network 602 are represented by the tensors $A_1$ and $A_2$ in FIG. 6B. Each of the tensors $A_1$ and $A_2$ is a subset of the corresponding weighted connections represented by $W_1$ and $W_2$ of the base network 600.

Figure 3:
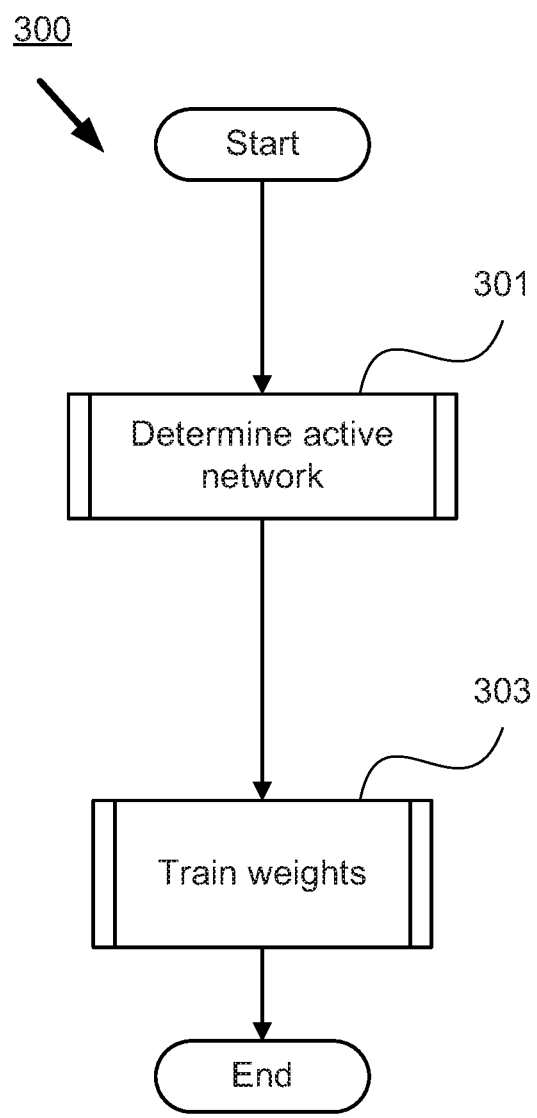
FIG. 3 is a schematic flow diagram showing a method of training the artificial neural network for an instance of a training dataset as used in the method of FIG. 2.

The method 300 of training the base network for one instance of the training dataset, as executed at step 205, will now be described with reference to FIG. 3. The method 300 may be implemented by one or more submodules of the application 833 stored in the memory 806, and controlled by execution of the processor 805.

Execution of the method 300 uses the training salience measure, the input values and the target of the selected instance of the training dataset as input. The method 300 starts with a determination step 301 for determining the active network 602. The active network is determined in execution of the step 301 by receiving or accessing the base network and the training salience measure of the selected training example to determine the active network, such as the active network 602. A method 400 of determining the active network, as executed at step 301, is described in more detail in FIG. 4. An example diagram of the active network 602 is described above in relation to FIG. 6B.

The method 300 continues under execution of the processor 805 to a training step 303, at which weights of the determined base network are trained. A method 500 of training weights, as executed at step 303, is described in more detail in relation to FIG. 5. Execution of the training step 303 uses the selected training data instance, the active network 602, and the corresponding target, and trains the base network 600.

Figure 4:
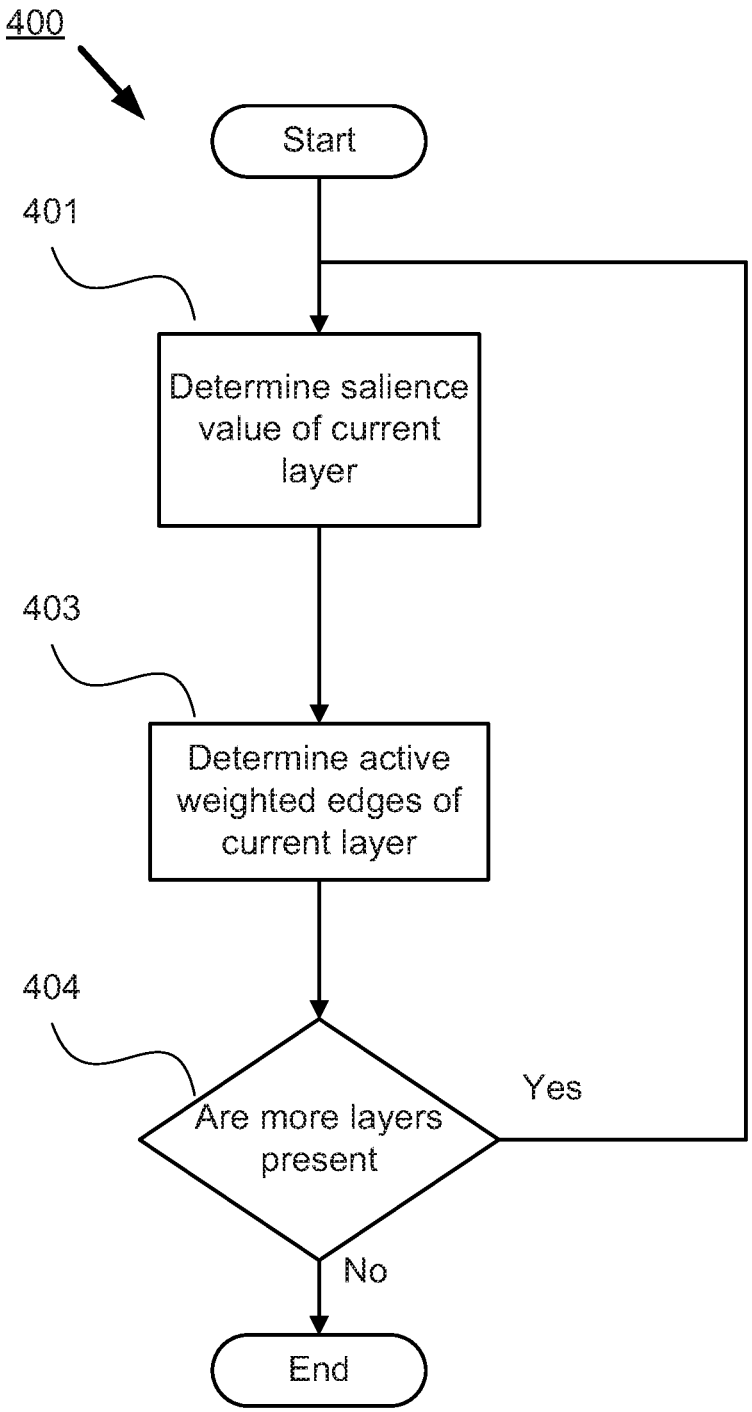
FIG. 4 is a schematic flow diagram showing a method of determining an active network based on a salience measure, as used in the method of FIG. 3.

The method 400 of determining the active network, as executed at the training step 301, is now described in relation to FIG. 4. The method 400 may be implemented by one or more submodules of the application 833 stored in the memory 806, and controlled by execution of the processor 805.

Execution of the method 400 starts at a determination step. At step 401, the method 400 executes, to determine salience values of nodes of a current layer of the base network. In a first iteration of the method 400, the input layer is the current layer. Execution of the determining step 401 uses the training salience measure of the selected training example and the base network 600, and assigns salience values for each node in the input layer of the base network 600. In assigning the salience values for each node in the input layer, the step 401 operates to determine salience values for the nodes of the initial layer from the training salience value of the selected instance of the training dataset.

Upon execution of the determination step 401, the method 400 progresses to a determination step 403. The method 400 executes the determination step 403 to determine active weighted connections of the input layer to the subsequent layer using the assigned salience values for the nodes of the current (input) layer. In a first iteration of the method 400, the subsequent layer is the first layer. The determination step 403 executes to select a subset of the weights of the input layer adjoining each node for the first layer of the base network 600. The determination step 403 executes to determine the selected subset of weights to be used as the weights for the corresponding layer in the active network. In determining the active weighted connections for the current layer, the method 403 operates to determine a subset of the connections based on the determined salience values for the nodes in the input layer. The step 403 operates to generate the active network by propagating the determined salience value of the current (initial) layer to the subsequent (first) layer.

Upon execution of the determination step 403, the method 400 progresses to a check step 404. The check step 404 executes to check if additional higher layers are present in the base network 600. If step 404 returns "Yes", that is if additional higher layers are present in the base network, the current layer of the base network is incremented (for example from the input layer to the first layer). The method 400 progresses to the determining step 401 to determine the salience value of the first layer nodes based on the determined salience values of the nodes in the previous (initial) layer. As described above, the method 400 executes to progress to the determining step 403 to determine the active weights for the subsequent (second) layer. The steps 401 and 403 are repeated for each additional layer of the base network. If execution of the check step 404 returns "No" (no higher layers are present in the base network 600), the method 400 ends.

In one implementation, the determining step 403 for determining the active weights for each layer of the active network is a probabilistic process, described as follows. For example, the base network 600 with 4 nodes in the input layer and 3 nodes in the first layer is used. The base network 600 comprises a fully-connected set of 12 weights between the nodes in each layer, as shown for the base network 600 in FIG. 6A. The determining step 401 determines the salience value of the input layer by assigning the training salience values of the nodes in the input layer of the base network 600, represented by a vector $s_0$, equal to the input salience measure of the selected instance of the training dataset. Each of the nodes in the input layer of the base network 600, represented using the vector $u_0$, are connected to a set of weighted connections, represented using the tensor $W_1$, as shown in FIG. 6A. The tensor $W_1$ represents weights between the input layer nodes $u_0$ and the first layer nodes $u_1$.

Table 1 below describes the relationship between the input layer nodes $u_0$, a salience vector $s_0$, a weight distribution $d_0$, and a number of weights to maintain $p_0$. The salience vector $s_0$ has the same dimension as the input layer nodes $u_0$, and the vectors $d_0$ and $p_0$ are calculated from $s_0$.

TABLE 1

| $u_0$ | $s_0$ | $d_0$ | $p_0$ |
|---|---|---|---|
| | 0.3 | 0.5 | 3 |
| | 0.1 | 0.125 | 1 |
| | 0.7 | 0.0 | 0 |
| | 0.1 | 0.375 | 2 |

The determination of the active weighted edges, as executed at step 403 for the first layer of the active network 602 of FIG. 6B is described as follows. Firstly, the step 403 executes to determine a number of weights to maintain in the first layer, represented as $m_1$. The number of weights to maintain in the first layer $m_1$ is determined as a fixed proportion of the total number of weights, $m_1 = k|W_1|$, based on a drop factor constant k. The drop factor constant k has a value between 0 and 1 and is typically determined experimentally. The number of weights to maintain $m_1$ for each input node is determined probabilistically according to the corresponding training salience measurement in the vector $s_0$.

For example if there are four nodes in the input layer and the salience vector is $s_0=[11.2, 0.3, 0.0, 0.9]$, giving a sum of 2.4. The distribution of the weights to maintain is determined proportionally to the saliency vector $s_0$, giving the distribution $d_0=[10.5, 0.125, 0.0, 0.375]$. Using a weight tensor $W_1$ as follows:

$$W_1=[[0.1, -0.3, -0.4], [0.7, -0.1, 0.9], [0.1, -0.2, -0.4], [0.2, 0.9, 0.3]]$$

the total number of weights in $W_1$ is 12, and using a drop factor constant k=0.5, the number of weights to maintain $m_1$ for the layer is 6. The number of weights to maintain for each node of $u_0$, represented as the vector $p_0$, is determined through random sampling using the distribution $d_0$ above, for example $p_0=[3, 1, 0, 2]$. In this instance, all 3 weights associated with the top node, 1 weight associated with the second highest node, no weights associated with the third highest node and 2 weights associated with the bottom node of the base network 600 are selected as active weights.

The active weights for the first layer of the active network (602), and the associated weighted connections, are represented as the tensor $A_1$, are shown in FIG. 6B. The active weights for the first layer are determined probabilistically by choosing a random set of weights connected to each node in $u_0$. The number of weights to be maintained for each node is specified by $P_0$, and the weights selected for each node are chosen with equal probability. An example of the maintained weighted connections is represented by the weight tensor $A_1$ as follows, where disabled weights are replaced with 0:

$$A_1[[0.1, -0.3, -0.4], [0.7, 0, 0], [0, 0, 0,], [0, 0.9, 0.3]]$$

The weight tensor $A_1$ represents the weights of the first layer of the active network 602 chosen by the determining step 403 for determining the active weighted edges for the current layer of the active network. In determining the active weighted edges, the step 403 operates to select a subset of connections of the base network, based on the determined salience values of the input layer.

If the base network 600 has a further layer, the method 400 progresses from the step 404 to the step 401 for the subsequent layer. In execution to determine the saliency value vector for the subsequent layer at step 401, $s_1$ the saliency vector values are passed from the saliency distribution of input layer $d_0$, using the absolute value of the maintained weights $A_1$, represented as $R_1$. The saliency values for the first layer nodes, represented as $s_1$, are determined according to $s_1=d_0R_1$.

For example $s_1=[0.214, 0.5, 0.425]$, where values have been rounded to three decimal places. In order to determine the weights to maintain in the second layer, the step 401 executes in the same manner as for the initial layer, for example producing the values $d_1=[0.188, 0.439, 0.373]$, $m_2=5$, $p_1=[1,2,2]$, where values have been rounded to three decimal places. Using a weight tensor for the second layer of the base network as follows:

$$W_2=[[-0.09, 0.07, 0.07], [-0.03, 0.07, 0.02], [0.01, -0.05, 0.05]]$$

the weight tensor $A_2$ of the active network is determined as:

$$A_2=[[-0.09, 0, 0], [-0.03, 0.07, 0], [0, -0.05, 0.05]]$$

When higher layers are present, the steps 401 and 403 to determine the saliency values and weights to maintain are repeated for each subsequent layer, to determine the active network 602.

Figure 5:
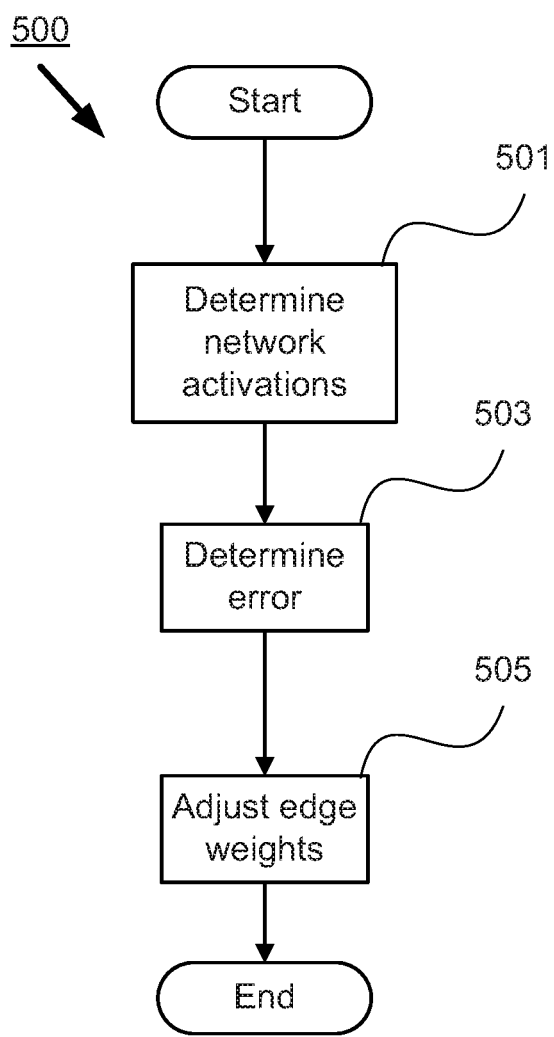
FIG. 5 is a schematic flow diagram showing a method of training weighted edges as used in the method of FIG. 3.

The method 500 of training weights, for one training example of the selected dataset, as executed at step 303, is described in relation to FIG. 5. The method 500 may be implemented by one or more submodules of the application 833 stored in the memory 806, and controlled by execution of the processor 805.

The method 500 begins with a determining step 501 for determining network activations. The determining step 501 executes to receive as input the active network 602 generated in the step 403 and the selected training input instance, and determine activation values for each node of the active network 602. For example, a training input representing a video clip is provided as input to the artificial neural network defined by the active network 602, and the determining step 501 executes to determine activation values for each of the nodes of the active network 602 determined by propagation of the input values to the subsequent layer for the subset of the connections determined in the step 403.

The method 500 executes to progress from the determining step 501 to a determining step 503. In execution of the step 503, the processor 805 executes to determine an error value for the network activations determined in step 501 compared to the training target for the selected instance of the training dataset. The determining step 503 executes to produce a value representing the error between the output produced by the active network 302 and the target. The error between the network activation determined in step 501 and the training target input represents determining a relationship between the input data and the training target.

The method 500 executes to progress from step 503 to an adjustment step 505. In the adjustment step 505, the processor 805 executes to adjust or modify the edge weights of the base network using the error value determined in the step 503 and the active network 602. In one example, execution of the step 505 on the processor 805 uses back-propagation of the error value determined in the step 503 throughout the active network 602 to determine modification for each weight. In adjusting the edge weights of the base network, the step 505 operates to train the base network, using the activation values determined in step 501, to determine a relationship between the input data values and the target.

Referring to the base network described in relation to FIG. 4, an example of training using an instance of a training dataset is now described. The example base network has 2 layers: an input layer with 4 nodes, a first layer with 3 nodes, and a second layer with 3 nodes. The second layer nodes, also known as output nodes, are of the same dimension as the training target of the instance of the training dataset. Weighted connections exist between the nodes in each layer of the base network, with 12 weights between the input and first layer nodes, and 9 weights between the first and second layer nodes.

For a given training input instance, for example with values [255, 0, 30, 128], the input nodes $n_0$, are set to the values of the training data instance. Using the active network 602, in which the weights of the first layer are represented using the tensor $A_1$, the activation values of the first layer nodes $n_1$ are determined as $n_1=\max(0, n_0A_1)$. Using the example active network 602 described in relation to FIG. 4, execution of the step 501 produces the activation vector $n_1=[25.5, 38.7, 0]$. The activation value for the output nodes $n_2$ are determined using the example weight tensor $A_2$ as follows:

$$n_1A_2=[-3.46, 4.49, 2.56]$$

$$n_2=\mathrm{softmax}(n_1A_2)=[0.0, 0.87, 0.13]$$

The error value, used for performing training of the base network 600, is determined by comparison of the output node activations $n_2$ with the training target, represented with the symbol t. The training target is provided as part of the training dataset. In this example the error value e is determined using the mean-squared error $e=(t-u_2)^2/|t|$. Using a target value of $t=[0,1,0]$, $e=0.03$ In the implementation described, adjustment of weights by the step 505 is executed by modifying each weight value in the weight tensors $A_1$ and $A_2$, according to the derivative $dA/de$. For example, the step 505 executes by setting $A_1=W_1+v\ dW_1/de$, where v is a constant defining the rate of learning, for example $v=0.01$. The constant defining the rate of learning, v, is typically determined experimentally. Modifications to the values of the weight tensors $A_1$ and $A_2$ are applied to the corresponding values in the base network 600 $W_1$ and $W_2$, performing training of the base network 600.

Figure 7:
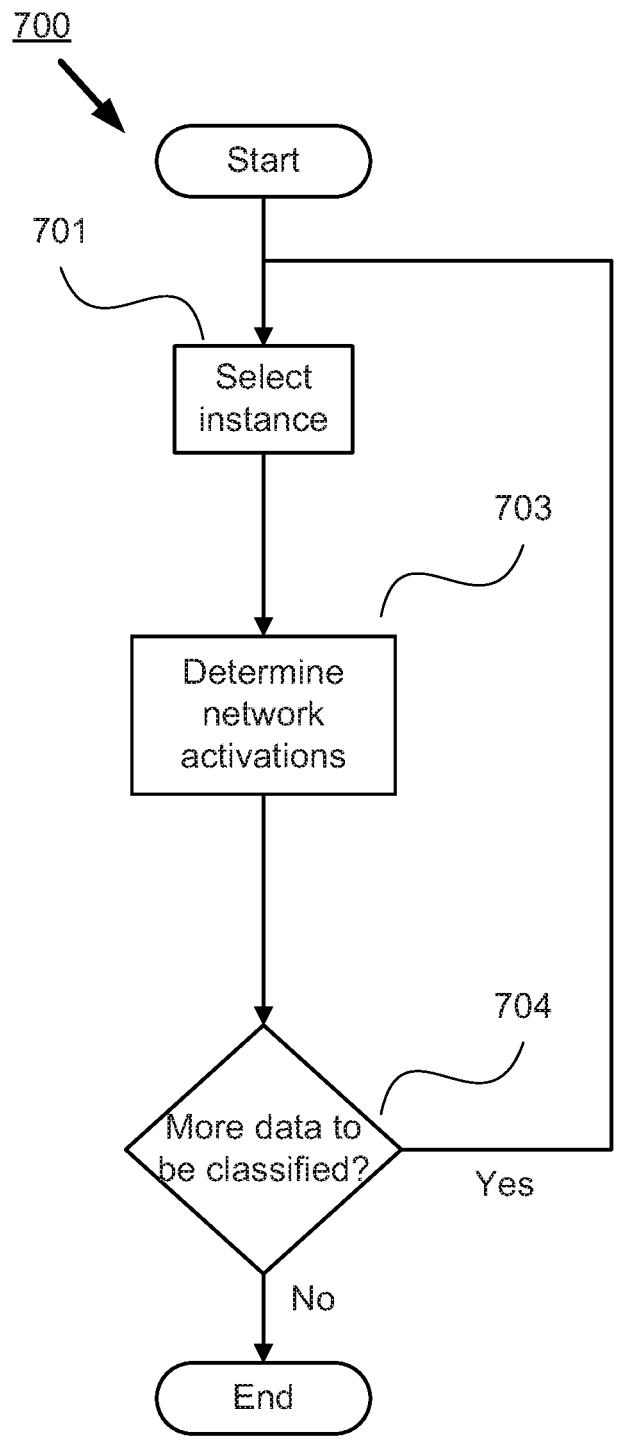
FIG. 7 is a schematic flow diagram showing a method of performing classification using an artificial neural network as in FIG. 1.

The method 700 of performing classification of data, as executed at step 106 of FIG. 1, is described in more detail with reference to FIG. 7. The method 700 may be implemented by one or more submodules of the application 833 stored in the memory 806, and controlled by execution of the processor 805.

The method 700 starts with execution of a selecting step 701 which selects an instance of classification input data from the set of data to be classified. The method 700 progresses to execute a determining step 703. The determining step 703 executes to determine network activations using the trained base network and the input instance selected in step 701 to determine activation values of the nodes in the base network 600. The step 703 executes using the same process for determining node activations as described in relation to the step 501 of FIG. 5. The classification label for the selected instance is determined using the activation values of the output nodes of the trained base network.

The method 700 progresses to execute a check step 704. The check step 704 executes to determine if more data is to be classified. If the check step 704 returns a Yes, that is more data is to be classified, the method 700 returns to repeat the step 701 and the step 703 as described above on a new instance of the classification data. If the step 704 determines that no more data is to be classified, the method 700 ends.

The step 704 may find that no more data is to be classified if all instances of data in the input dataset have been classified, or if a predetermined number of data instances of the input have been classified.

An example use of the methods of training an artificial neural network is for an application for detecting human action in video. Using the example of 500 video frames described above, an artificial neutral network is trained on the computer module 801 using the methods described to identify human action in the video sequence. The trained artificial neural network can be stored on the computer module 801, or on a removable storage device such as the medium 825, or on another computing device. The stored trained artificial neural network can be used to build an application for detecting human action in video operable on the computer module 801 or another computing device.

In a further implementation, the arrangements described are used for classification of objects in images, and for object discrimination, where the boundary of objects present in an image are determined. Another example of using the training saliency measure for training an artificial neural network for object discrimination is use of edge and contour based measures of image salience.

A further implementation is use of the described arrangements to train an artificial neural network for speech recognition and classification of audio and other temporal data. An example training saliency measure for classification of audio data is that based on measures of pitch and rhythm for identifying transitional probabilities.

The arrangements described are applicable to the computer and data processing industries and particularly for the image and audio processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of training an artificial neural network comprising a plurality of layers including at least an initial layer and a subsequent layer and a plurality of connections between nodes arranged in successive layers, the method comprising:

receiving a training example for the artificial neural network, the training example having a plurality of input values each corresponding to respective one of a plurality of nodes in the initial layer, a target, and associated training salience values each indicating an importance of respective one of the input values for determining the target of the artificial neural network;

determining respective salience values for the plurality of nodes of the initial layer from the training salience values of the received training example;

selecting a subset of connections between the plurality of nodes in the initial layer and a plurality of nodes in the subsequent layer, wherein in the selected subset of connections, a number of connections assigned for respective one of the plurality of nodes in the initial layer is determined based on a distribution of the determined respective salience values for the plurality of nodes of the initial layer;

generating an active network by propagating the determined respective salience values to at least one node of the subsequent layer using the selected subset of the connections; and training the artificial neural network using the generated active network, wherein the trained artificial neural network is configured to determine a relationship between the input data values and the target.

2. The method according to claim 1 wherein the artificial neural network comprises an input layer, and the determined salience values for the plurality of nodes in the initial layer are determined by propagating the received salience value using connections from the input layer to the initial layer.

3. The method according to claim 1 wherein the artificial neural network has more than one subsequent layer.

4. The method according to claim 1, wherein the artificial neural network has more than one subsequent layer and the method further comprises:

determining salience values for nodes of a first layer of the subsequent layers from the training salience value of the received training example, and determining an activation value for a second layer of the subsequent layers by propagating the input values using a subset of the connections, the subset of the connections being selected based upon the determined salience values for the first layer.

5. The method according to claim 1, wherein the subset of the connections is determined based upon a fixed proportion of a total number of weights associated with the connections in the initial layer.

6. The method according to claim 1, wherein the subset of the connections is determined based upon a fixed proportion of a total number of weights associated with the connections in the initial layer, and the fixed proportion of the total number of weights is determined experimentally.

7. The method according to claim 1, wherein the subset of the connections is determined based upon a fixed proportion of a total number of weights associated with the connections in the initial layer, and the fixed proportion of a total number of weights is determined probabilistically according to the associated training salience measurement.

8. The method according to claim 1, wherein the subset of the connections is determined based upon a fixed proportion of a total number of weights associated with the connections in the initial layer, and a distribution of the fixed proportion of the weights is determined proportionally to the determined salience value.

9. The method according to claim 1, wherein the subset of the connections is determined using random sampling of a distribution of connections in the initial layer.

10. The method according to claim 1, wherein the subset of the connections is determined based upon a fixed proportion of a total number of weights associated with the connections in the initial layer, the fixed proportion of a total number of weights is determined probabilistically according to the associated training salience measurement, and the weights are selected with equal probability.

11. The method according to claim 1, further comprising determining an error value representing a difference between the determined activation values and the target.

12. The method according to claim 1, further comprising determining an error value representing a difference between the determined activation values and the target, and wherein the artificial neural network is trained using the determined error value.

13. The method according to claim 12, further comprising determining an error value representing a difference between the determined activation values and the target, wherein the artificial neural network is trained using the determined error value, and wherein the training comprises back propagating the determined error value throughout the artificial neural network.

14. The method according to claim 1, further comprising receiving a plurality of training examples;

determining salience values for nodes of the initial layer from the training salience value for each of the received training examples;

determining, for each of the plurality of training examples, an activation value for at least one node of the subsequent layer by propagating the input values using the subset of the connections selected based on the determined salience values for the nodes of the initial layer;

determining an average of the activation value for the plurality of training examples; and training the artificial neural network using the determined average activation value.

15. The method according to claim 1, wherein the target is equal to the training input values.

16. The method according to claim 1, further comprising receiving a plurality of additional training examples;

classifying the plurality of additional training examples using the trained artificial neural network;

determining an accuracy of the trained artificial neural network using the classification of the additional examples; and determining whether to further train the artificial neural network by comparing the determined accuracy to a predetermined accuracy of the artificial neural network.

17. A non-transitory computer readable storage medium having a computer program stored thereon for training an artificial neural network comprising a plurality of layers including at least an initial layer and a subsequent layer and a plurality of connections between nodes arranged in successive layers, said program comprising:

code for receiving a training example for the artificial neural network, the training example having input values each corresponding to respective one of a plurality of nodes in the initial layer, a target, and associated training salience values each indicating an importance of respective one of the input values for determining the target of the artificial neural network;

code for determining respective salience values for the plurality of nodes of the initial layer from the training salience values of the received training example;

code for selecting a subset of connections between the plurality of nodes in the initial layer and a plurality of nodes in the subsequent layer, wherein in the selected subset of connections, a number of connections assigned for respective one of the plurality of nodes in the initial layer is determined based on a distribution of the determined respective salience values for the plurality of nodes of the initial layer;

code for generating an active network by propagating the determined respective salience values to at least one node of the subsequent layer using the selected subset of the connections; and code for training the artificial neural network using the generated active network, wherein the trained artificial neural network is configured to determine a relationship between the input data values and the target.

18. An apparatus for training an artificial neural network comprising a plurality of layers including at least an initial layer and a subsequent layer and a plurality of connections between nodes arranged in successive layers, the apparatus comprising:

one or more processors; and one or more memories storing instructions, when executed by the one or more processors, causing the apparatus to:

receive a training example for the artificial neural network, the training example having a plurality of input values each corresponding to respective one of a plurality of nodes in the initial layer, a target, and associated training salience values each indicating an importance of respective one of the input values for determining the target of the artificial neural network;

determine respective salience values for the plurality of nodes of the initial layer from the training salience values of the received training example;

select a subset of connections between the plurality of nodes in the initial layer and a plurality of nodes in the subsequent layer, wherein in the selected subset of connections, a number of connections assigned for respective one of the plurality of nodes in the initial layer is determined based on a distribution of the determined respective salience values for the plurality of nodes of the initial layer;

generate an active network by propagating the determined respective salience values to at least one node of the subsequent layer using the selected subset of the connections; and train the artificial neural network using the generated active network, wherein the trained artificial neural network is configured to determine a relationship between the input data values and the target.

19. A system for training an artificial neural network comprising a plurality of layers including at least an initial layer and a subsequent layer and a plurality of connections between nodes arranged in successive layers, the system comprising:

a memory for storing data and a computer program;

a processor coupled to the memory for executing said computer program, said computer program comprising instructions for:

receiving a training example for the artificial neural network, the training example having a plurality of input values each corresponding to respective one of a plurality of nodes in the initial layer, a target, and associated training salience values each indicating an importance of respective one of the input values for determining the target of the artificial neural network;

determining respective salience values for the plurality of nodes of the initial layer from the training salience value of the received training example;

selecting a subset of connections between the plurality of nodes in the initial layer and a plurality of nodes in the subsequent layer, wherein in the selected subset of connections, a number of connections assigned for respective one of the plurality of nodes in the initial layer is determined based on a distribution of the determined respective salience values for the plurality of nodes of the initial layer;

generating an active network by propagating the determined respective salience values to at least one node of the subsequent layer using the selected subset of the connections; and training the artificial neural network using the generated active network, wherein the trained artificial neural network is configured to determine a relationship between the input data values and the target.

* * * * *